United States Patent [19]

Shukla et al.

[11] Patent Number: 4,773,847
[45] Date of Patent: Sep. 27, 1988

[54] THERMOELECTRIC FIELD BURNER

[75] Inventors: Kailash C. Shukla, Stow; Michael P. Grimanis, Medford; James R. Hurley, East Weymouth; Dean T. Morgan, Sudbury, all of Mass.

[73] Assignee: Tecogen, Inc., Waltham, Mass.

[21] Appl. No.: 25,546

[22] Filed: Mar. 13, 1987

[51] Int. Cl.$^4$ .......................................... H01L 35/28
[52] U.S. Cl. ...................... 431/46; 431/328; 431/243; 431/6; 136/208
[58] Field of Search ...................... 431/41, 43, 44, 45, 431/46, 1, 18, 80, 258, 328, 243; 136/208

[56] References Cited

U.S. PATENT DOCUMENTS

| Re. 28,679 | 11/1971 | Robinson | 431/9 |
|---|---|---|---|
| 1,231,152 | 6/1917 | Good. | |
| 1,345,361 | 7/1920 | Good. | |
| 2,213,656 | 9/1940 | Pinberton et al. | 431/41 |
| 2,361,400 | 10/1944 | Holthouse | 431/41 |
| 2,456,076 | 12/1948 | Ofeldt. | |
| 2,625,211 | 1/1953 | Hill | 431/41 |
| 3,174,533 | 3/1965 | Weber | 431/44 |
| 3,174,534 | 3/1965 | Weber | 431/44 |
| 3,174,535 | 3/1965 | Weber | 431/44 |
| 3,238,991 | 3/1966 | Goldmann et al. | 431/328 |
| 3,245,457 | 4/1966 | Smith et al. . | |
| 3,326,262 | 6/1967 | Weller, Jr. et al. | 431/41 |
| 3,457,121 | 7/1969 | Tomlinson | 136/208 |
| 3,810,732 | 5/1974 | Koch | 431/328 |
| 3,986,813 | 10/1976 | Hewitt | 431/80 |
| 4,025,284 | 5/1977 | Horn et al. | 431/80 |
| 4,131,413 | 12/1978 | Ryno | 431/44 |
| 4,480,986 | 11/1984 | Nelson et al. | 431/37 |
| 4,565,519 | 1/1986 | Carignan | 431/80 |

FOREIGN PATENT DOCUMENTS

| 0102825 | 8/1980 | Japan | 431/41 |
|---|---|---|---|
| 420016 | 11/1954 | United Kingdom | 431/41 |

Primary Examiner—Carroll B. Dority, Jr.
Attorney, Agent, or Firm—Herbert E. Messenger

[57] ABSTRACT

A liquid-fueled thermoelectric field burner operable in two modes, a start-up mode and a steady-state mode. A rechargeable battery backed up by a manually operated generator permits cold start-up of a preheat burner followed by operation of a main burner which provides heat to thermoelectric converters which operate to provide necessary power for steady-state operation. Cold start-up is facilitated by atomizing the liquid fuel for combustion in the preheat burner, and steady-state blue flame operation is enhanced by mixing vaporized fuel and preheated air for combustion in a main burner. The thermoelectric converters are cooled by air from a cooling blower.

12 Claims, 2 Drawing Sheets

THERMOELECTRIC FIELD BURNER

This invention was made with Government support under Contract No. DAAK60-85-C-0090 awarded by the Department of the Army. The Government has certain rights in this invention.

This invention relates in general to field burners and in particular to the combination of a field burner with a thermoelectric converter for generating power for use in the burner and for other purposes.

BACKGROUND OF THE INVENTION

Field kitchens have been employed by the armed forces for many years. Since prior to World War II, the basic burner for field kitchens has been a gasoline burner known as the M2 burner. A highly efficient blue flame is produced generally with premixes of vaporized gasoline and aspirated air. For a number of reasons, including availability of fuel, greater safety, and versatility, there has been a need for a burner which will operate on whatever liquid fuel is available and which can be started at ambient temperatures as low as −20° F. Moreover, the burner should be capable of producing a quality blue flame with a minumum of noxious emissions irrespective of the fuel being used.

A true multi-fuel field burner should be capable of utilizing any one of several fuels, including gasoline, kerosene, ethanol, methanol, and diesel. The requirement of starting the burner at an ambient temperature as low as the −20° F. noted above poses no problem with gasoline, which has a flash point far below that figure. However, the other fuels mentioned have flash points considerably above that figure, and diesel fuel in particular is rated at 70° C. Thus, of all the conventional fuels having flash points on the positive temperature scale, diesel fuel presents the toughest cold-starting problem. Diesel fuel also has the highest final boiling point, at about 340° C., which makes it the most difficult of those fuels to vaporize for use in a premix fuel/air burner, as well as the most difficult fuel with which clean combustion can be achieved.

The advantages of available electric power self-contained at a portable field burner are obvious. Among the components which can be operated conveniently electrically are a combustion blower, a fuel pump, a cooling blower, an ignition control system, and an ultrasonic atomizer for premixing fuel and air prior to combustion in order that it will burn cleanly as a blue-flame burner without coking. The advantages are even greater when that power is derived from a thermoelectric converter combined with and energized by the field burner.

There have been some efforts made to utilize diesel fuel in the production of a clear blue flame for purposes other than field burners and some favorable results have been obtained in such areas as domestic hot-water heating. Also, of course, thermoelectric converters have been developed which are capable of generating practical quantities of electric power. The successful combination of a thermoelectric converter with a clean blue-flame diesel fuel burner in which the thermoelectric converter fills the electrical power requirements of the burner has not been developed, however.

SUMMARY OF THE INVENTION

The present invention results from the combining of the teachings of the arts of liquid fuel burners and thermoelectric converters to produce heat and electric power in a system operable with fuels having characteristics as difficult as those of #2 diesel fuel, but yet capable of cold start-up at low ambient temperatures and achieving blue-flame combustion with acceptably low noxious emissions. During start-up the electric power is derived from a battery or a hand-cranked electrical generator in the system, or by "jump start" from an external source such as a vehicle battery, until power becomes available from a thermoelectric generator. Because electric power is thus self-contained and available at all times, an ultrasonic atomizer may first be used to atomize the #2 diesel fuel or any other conventional liquid fuel at ambient temperatures as low as −20° F. with the atomizer functioning in a first mode as a direct burner for preheating the combustion system during the start-up period. Subsequently, it operates in a second mode to assist as a vaporizer of fuel for the premixed fuel/air blue-flame normal burner operations.

A rechargeable battery powers the initial start-up of the field burner under normal circumstances, but a hand-driven generator is available for back-up protection and external sources may also be used. With the initial flow of power, an ultrasonic atomizer is energized to atomize the diesel fuel and a blower is activated to provide combustion air. Simultaneous excitation of a glow coil triggers combustion which rapidly propagates throughout the interior of the preheat burner, the walls of which are thus preheated. After the walls reach a preset temperature, combustion in the preheat burner is interrupted.

The ultrasonic atomizer continues to provide a dispersion of fuel droplets which are vaporized in the air preheated by the burner walls. The vaporized fuel dispersion and air from a preheat chamber serve as a premixed fuel gas/air mixture for the main burner, which is ignited by a glow coil. The main burner in steady-state operation then produces a compact blue flame and hot combustion gases which impinge upon a reradiant plate. The hot gases then pass through the openings in a perforated baffle, and exit at the sides of the plate. Heat is transferred by radiation from the plate and convection from the combustion gases to a cooking load. Similarly, heat is transferred by radiation and convection from the perforated baffle to thermoelectric converters which are mounted about the periphery of the main burner combustion chamber. The converters provide necessary power for electrical components such as controls, the fuel pump, the ultrasonic atomizer, the combustion blower, and a cooling blower. Much of the air for main burner combustion is passed through an annular duct surrounding the bottom of the burner chamber, in which it is preheated, and at least some air at ambient temperature is circulated over the housing of the atomizer to cool it.

For a better understanding of the present invention, together with other and further objects, features, and advantages, reference should be had to the following description of a preferred embodiment which should be read with reference to the appended drawing in which:

DESCRIPTION OF PREFERRED EMBODIMENTS

Figure 1:
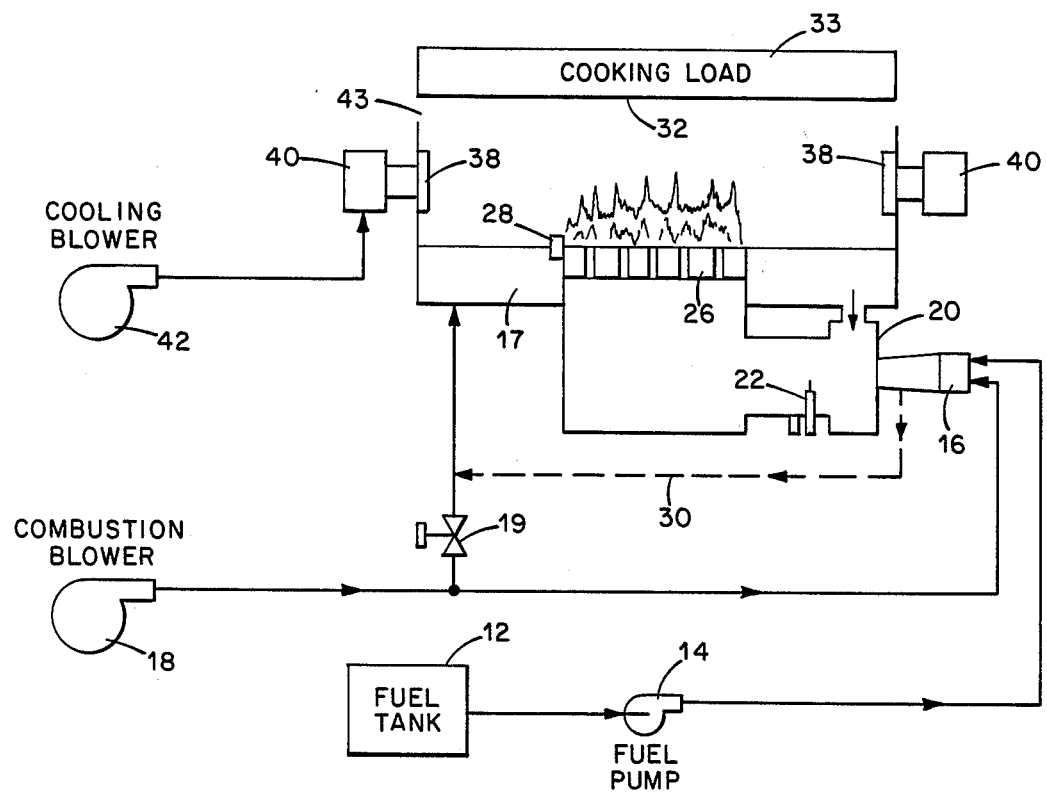
FIG. 1 is a flow schematic of the burner system of the invention.
Figure 2:
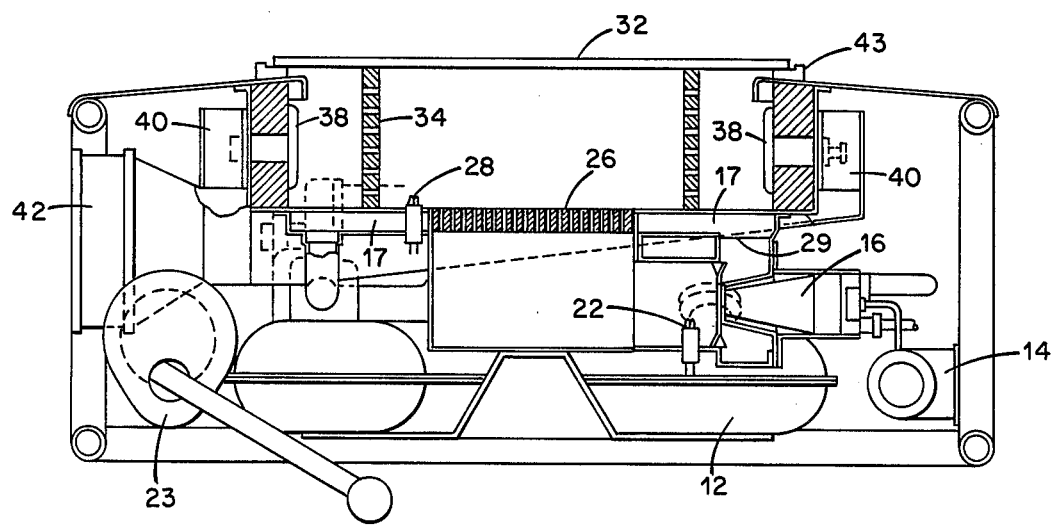
FIG. 2 is a side assembly view of the burner of the invention.

The flow schematic of FIG. 1 and the side assembly view of FIG. 2 illustrate a fuel tank 12 from which fuel is pumped by a fuel pump 14 to an ultrasonic atomizer 16. A combustion blower 18 is arranged to supply air to the ultrasonic atomizer 16 and to a preheat chamber 17 in proportions determined by an air valve 19. The ultrasonic atomizer 16, which may, for example, be a Model No. 66-1000-6062 atomizer available from Spraco of Nashua, N.H., discharges air and atomized fuel into a horizontal tube 20 which constitutes a preheat burner. Adjacent the input to the horizontal tube is a glow coil 22 to serve as an ignitor. The warm-up sequence is normally initiated when a switch is thrown to provide power to the fuel pump, the combustion blower, the ultrasonic atomizer, and the glow coil 22. Power at this time is derived from a battery, not shown in this view, or from a hand-cranked generator 23 in the event that the battery is inoperable, or from an external source such as a 24-volt battery of a motor vehicle.

Atomization of the diesel fuel can and does occur at temperatures at least as low as −20° F. The glow coil 22 in the horizontal tube 20 ignites the air/fuel mixture and combustion takes place within the horizontal tube in the vicinity of the atomizer and ignitor. Operation of the horizontal tube preheat burner continues until the walls of the horizontal tube reach a preset temperature.

At this time, a main burner 26 is ready for operation, and combustion in the preheat burner is momentarily stopped as fuel flow is interrupted and the ignitor 22 is switched off. Fuel flow is then resumed and a mix of fuel vaporized in the air preheated by the walls of the horizontal tube of the preheat burner is ignited by a second ignitor 28 as it emerges from the main burner 26. Combustion air from the annular preheat chamber 17 is introduced into the horizontal tube 20 through an inlet 29 adjacent the atomizer to mix with vaporized fuel and continue main burner operation.

During operation of the main burner 26 the supply of combustion air may be split by operation of the valve 19 so that most of the air (e.g., about ninety percent) passes through the annular preheat chamber 17 and the remainder flows over an inner housing of the atomizer 16 to cool its crystal to a suitable temperature such as below 150° F. Alternatively, as indicated by the broken line 30 in FIG. 1, all of the combustion air may (both during warm-up and main burner operation) be flowed over the atomizer housing and then through the preheat chamber 17 prior to introduction into the horizontal tube 20. In either case, noxious emmissions are acceptably low due to operation of the burner 26 as a 100 percent premix burner.

The main burner 26 consists essentially of a perforated ceramic tile which serves as the flame holder and produces a compact blue flame. Above and facing the flame holder is mounted a reradiant plate 32, preferably metallic, which supports a cooking load 33. A perforated baffle 34 which surrounds the flame holder extends upwardly to meet the reradiant plate 32 forming a chamber above the main burner. Heat is radiated from the main burner flame holder 26 to the reradiant plate 32 and simultaneously hot combustion gases from the perforated baffle impinge upon the reradiant plate 32. High thermal efficiency of heat transfer to the reradiant plate 32 by the combined convection and radiation modes is thus assured.

The hot combustion gases after impinging upon the reradiant plate 32 pass through the perforations of the baffle 34, which may be formed of silicon carbide or of a metal such as aluminized steel or Inconal alloy, depending on the temperature of the combustion gases. The gases then impinge upon the faces of thermoelectric converters 38 which are arrayed about the perforated baffle 34 and which may be formed of suitable thermoelectric materials such as bismuth telluride (BiTe) or silicon germanium/gallium phosphide (SiGe/GaP). Bismuth telluride thermoelectric converters, which are currently preferred because they are operable at relatively moderate temperatures—i e , a hot junction temperature of about 600° F.—are available from Teledyne Energy Systems of Timonium, Md. Again, efficient heat transfer takes place by reason of the radiation from the hot baffle 34 and convection from the combustion gases which pass through the perforations to impinge upon the thermoelectric converters. Cooling fins 40 to reject excess heat are mounted at the outer extremities of the thermoelectric converters in an annular duct. A cooling blower 42 provides an airstream which impinges upon the cooling fins 40. The combustion gases ultimately exit through the annular slot 43 formed under the reradiant plate 32.

Figure 3:
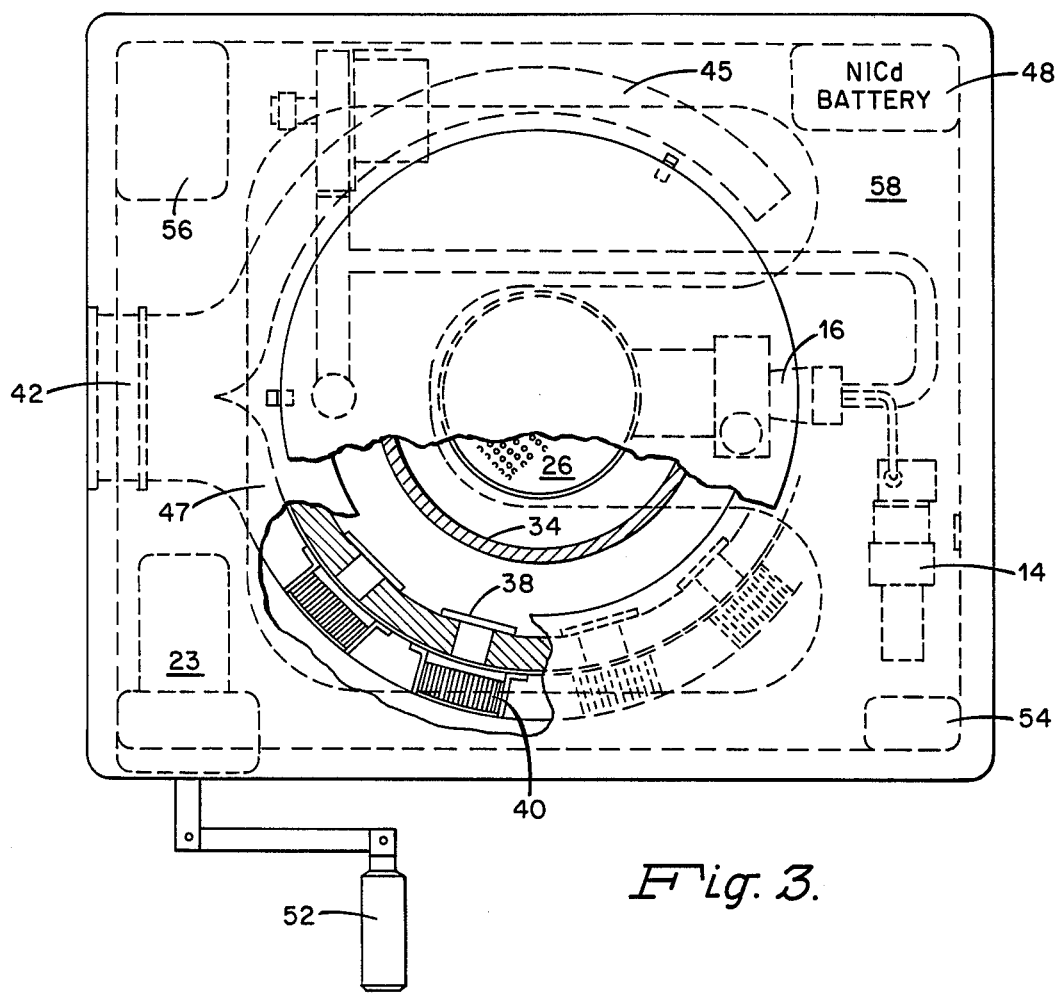
FIG. 3 is a top assembly view of the field burner of the invention.

The assembly top view of FIG. 3 shows the disposition of components and the compact nature of the field burner which may, for example, be packaged in a unit of dimensions about 19 inches by 23 inches by 10 inches high. At the upper right-hand corner of the assembly, a rechargeable battery 48, preferably of the nickel-cadmium type, is shown. This, of course, is the primary source of electrical power for start-up of the self-contained portable burner. At the lower left-hand corner of the assembly, there may be seen the emergency DC generator 23 having a folding hand crank 52 which is available as a back-up power source for start-up in the event of failure of the battery 48. An oscillator 54 for the ultrasonic atomizer 16 may be seen in the lower right-hand corner. A compartment 56 at the upper left-hand corner contains the controls for the field burner. These controls include a microprocessor and are preferably of the solid state type capable of withstanding the type of rough treatment experienced in the field.

In the cut-away portion of FIG. 3, various elements of the apparatus are plainly shown. Beneath the top cover plate 58, the ceramic tile flame holder 26 may be seen toward the center of the figure. The perforated baffle 34 which surrounds the main burner is also visible. Two of the plurality of thermoelectric converters 38 which are arrayed in a circle about the perforated baffle may be seen. The converters 38 have faces in the path of radiation and of the hot combustion gases jetting outwardly from the perforated baffle 34. The cooling fins 40 for the thermoelectric converters are also shown disposed in the path of air discharged by the cooling blower 42 through the arcuate legs 45 and 47 of a cooling duct.

Figure 4:
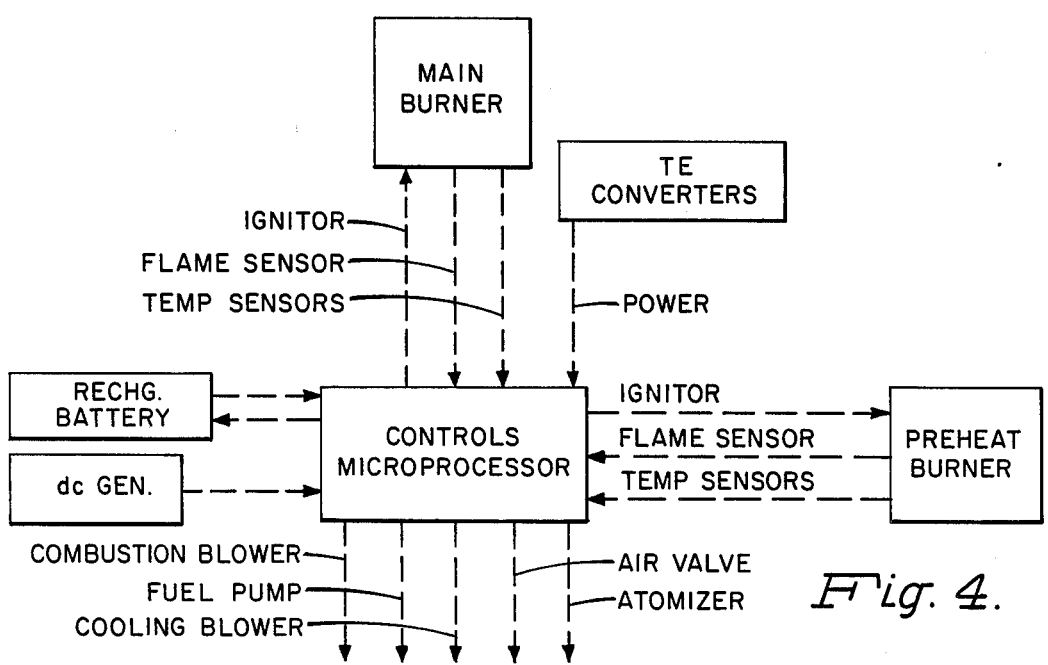
FIG. 4 is a schematic outline of electrical functions of the system.

The system for control of the self-powered field burner apparatus is schematically outlined in FIG. 4, the key element being a microprocessor. The rechargeable battery 48 and DC generator 23 discussed above are shown at the left. The basic preheat burner powered components, namely, the combustion blower 18, the fuel pump 14 and the atomizer 16 are shown below the microprocessor, as is the air valve 19 which may be operated as required to direct combustion air in proper proportions to the atomizer and the preheat chamber. In response to the throwing of a switch, power flows to these components as well as to the ignition shown at the right to initiate the start-up mode of operation. Should the battery have failed, the manually operable DC generator may be hand-cranked for several minutes to provide necessary power.

After a period of several minutes, when a sensor in the preheat burner detects that a preset temperature is reached and sensed, combustion in the preheat burner is interrupted by the action of the microprocessor momentarily cutting off power to the preheat burner fuel pump. At this time, combustion is initiated above the flame holder of the main burner 26 as vaporized fuel and combustion air most or all of which is preheated, flow into the main burner to be ignited by the glow coil 28. A steady-state clean blue flame then emanates from the main burner. A suitable fuel input to the gas-fired burner 26 is about 70,000 BTU/hour, with about 60,000 BTU/hour available to the cooking load and about 10,000 BTU/hour passed to the thermoelectric converter 38. The generation of power by the thermoelectric converter and cooling of the converters begins and that power, for example, up to about 60 watts, is available to run powered burner components, recharge the battery, and to operate accessory electrical equipment if desired. Necessary switching to accomplish the desired functions is provided by the control microprocessor. Safety and timing devices such as the flame and temperature sensors shown for both burners are also responsive in operation to the microprocessor.

What is claimed is:

1. A liquid-fueled self-powered thermoelectric field burner operable to combust any liquid selected from the group consisting of gasoline, kerosene, ethanol, methanol, diesel fuel, and mixtures thereof and to start up at an ambient temperature as low as about −20° F. comprising a preheat burner formed with enclosing walls, means for supplying combustion air and atomized liquid fuel as a mixture to said preheat burner in a start-up mode until said walls reach a predetermined temperature, first ignition means for igniting said mixture of atomized liquid fuel and combustion air in said preheat burner, means for switching off said first ignition means and interrupting the flow of liquid fuel so as to momentarily stop combustion in said preheat burner after said walls reach said predetermined temperature, a main burner communicating with said preheat burner, means for introducing a premix of air and atomized liquid fuel within said enclosing walls of said preheat burner after said combustion therein has been interrupted whereby said fuel is vaporized, second ignition means for igniting said premix of air and atomized liquid fuel near said main burner, means for operating said main burner in a steady-state mode by combustion of said premix of air and vaporized fuel, a plurality of thermoelectric converters arrayed about said main burner, and means for transferring heat from said main burner during steady-state operation thereof to said thermoelectric converters to generate electric power.

2. A liquid-fueled self-powered thermoelectric field burner as defined in claim 1 wherein said means for supplying combustion air and liquid fuel to said preheat burner comprises an atomizer operable to atomize said liquid fuel at ambient temperatures as low as about −20° F. and through which said combustion air passes.

3. A liquid-fueled self-powered thermoelectric field burner as defined in claim 2 and further comprising means for directing radiation and combustion gases from said main burner upon said thermoelectric converters.

4. A liquid-fueled self-powered thermoelectric field burner as defined in claim 2 wherein said main burner includes an upwardly facing perforated tile and further including a reradiant plate spaced from and facing said tile, a perforated baffle surrounding said tile inwardly of said array of thermoelectric converters and extending upwardly to said reradiant plate, radiation and combustion gases from said main burner impinging upon said reradiant plate and said perforated baffle, radiation from and combustion gases passing through said perforated baffle impinging upon said thermoelectric converters.

5. A liquid-fueled self-powered thermoelectric field burner as defined in claim 1 wherein said means for supplying combustion air and said liquid fuel to operate said preheat burner in a start-up mode includes a source of electric power, an atomizer connected to said preheat burner and operable to atomize said liquid fuel at ambient temperatures as low as about −20° F., a fuel pump for directing liquid fuel to said atomizer, a combustion blower for directing combustion air to said atomizer, said fuel pump, combustion blower and said atomizer being connected to and deriving operating power from said source of electric power during the period of said start-up mode.

6. A liquid-fueled self-powered thermoelectric field burner as defined in claim 5 wherein said source of electric power comprises a rechargeable battery and means for connecting said thermoelectric converters to said battery to recharge said battery during predetermined periods of said steady-state mode.

7. A liquid-fueled self-powered thermoelectric field burner as defined in claim 5 wherein said source of electric power comprises a rechargeable battery for normally supplying power for operation of said preheat burner during said start-up mode and a manually operated generator for supplying said power upon failure of said rechargeable battery.

8. A liquid-fueled self-powered thermoelectric field burner as defined in claim 5 and further comprising walls defining an air preheat chamber disposed about the perforated tile of said main burner, said air preheat chamber connected to and operable to receive air from said blower and connected to and operable to provide preheated air to said preheat burner.

9. A liquid-fueled self-powered thermoelectric field burner as defined in claim 1 including a cooling system for said thermoelectric converters, said cooling system including a duct, cooling fins attached to each of said thermoelectric converters and disposed in said duct and a cooling blower for directing air through said duct and upon said cooling fins, said cooling blower connected to, and deriving operating power from, said thermoelectric converters.

10. A liquid-fueled self-powered thermoelectric field burner as defined in claim 1 and further including a microprocessor for controlling said preheat burner and interrupting combustion therein at said predetermined temperature to terminate operation in said start-up mode and for initiating combustion in said main burner for said operation in a steady-state mode after interruption of combustion in said preheat burner.

11. A liquid-fueled self-powered thermoelectric field burner as defined in claim 8 and further including valve means for regulating the amount of combustion air passing from said combustion blower to said air preheat chamber and from said combustion blower to said atomizer.

12. A liquid-fueled self-powered thermoelectric field burner as defined in claim 6 wherein said means for connecting said thermoelectric converters to said battery is also operable to connect said thermoelectric converters to said fuel pump, said atomizer, and said combustion blower.

* * * * *